United States Patent [19]

Bürge et al.

[11] 4,442,021
[45] Apr. 10, 1984

[54] METHOD OF PROTECTING REINFORCING BARS, PRE-STRESSING CABLES AND SIMILAR ARTICLES INSIDE OF STRUCTURES

[75] Inventors: Theodor Bürge, Geroldswil; Gustav Bracher, Rifferswil, both of Switzerland

[73] Assignee: Sika AG, vorm. Kaspar Winkler & Co., Zurich, Switzerland

[21] Appl. No.: 396,152

[22] Filed: Jul. 8, 1982

[30] Foreign Application Priority Data

Jul. 20, 1981 [CH] Switzerland ................. 4750/81

[51] Int. Cl.$^3$ ................. C23F 11/18; C23F 11/10
[52] U.S. Cl. ................. 252/389 R; 106/14.15; 106/76; 106/90; 106/98; 422/6; 422/8
[58] Field of Search ................. 252/389 R, 389.3; 106/14.15, 76, 90, 98; 422/6, 8

[56] References Cited

U.S. PATENT DOCUMENTS

| | | | |
|---|---|---|---|
| 3,210,207 | 10/1965 | Dodson et al. | 106/90 |
| 3,801,338 | 4/1974 | Whitaker | 106/90 |
| 3,976,494 | 8/1976 | Kudo et al. | 252/389 R |
| 4,285,733 | 8/1981 | Rosenberg et al. | 106/98 |
| 4,318,744 | 3/1982 | Dodson | 106/90 |

*Primary Examiner*—Irwin Gluck
*Attorney, Agent, or Firm*—Abelman, Frayne & Rezac

[57] ABSTRACT

According to this method of corrosion protection a coating comprising an aqueous suspension of 10–99.99% of hydraulic binding agents, preferably cement or mixtures thereof with latent hydraulic additives, and 0.01–10% corrosion inhibitors is applied onto the metallic articles intended to be enclosed in structures. The application of these specific protective slurries is advantageous in that they adhere especially well are force-locked, respectively, to the structures of an inorganic material, specifically to concrete and to the metallic articles.

13 Claims, 5 Drawing Figures

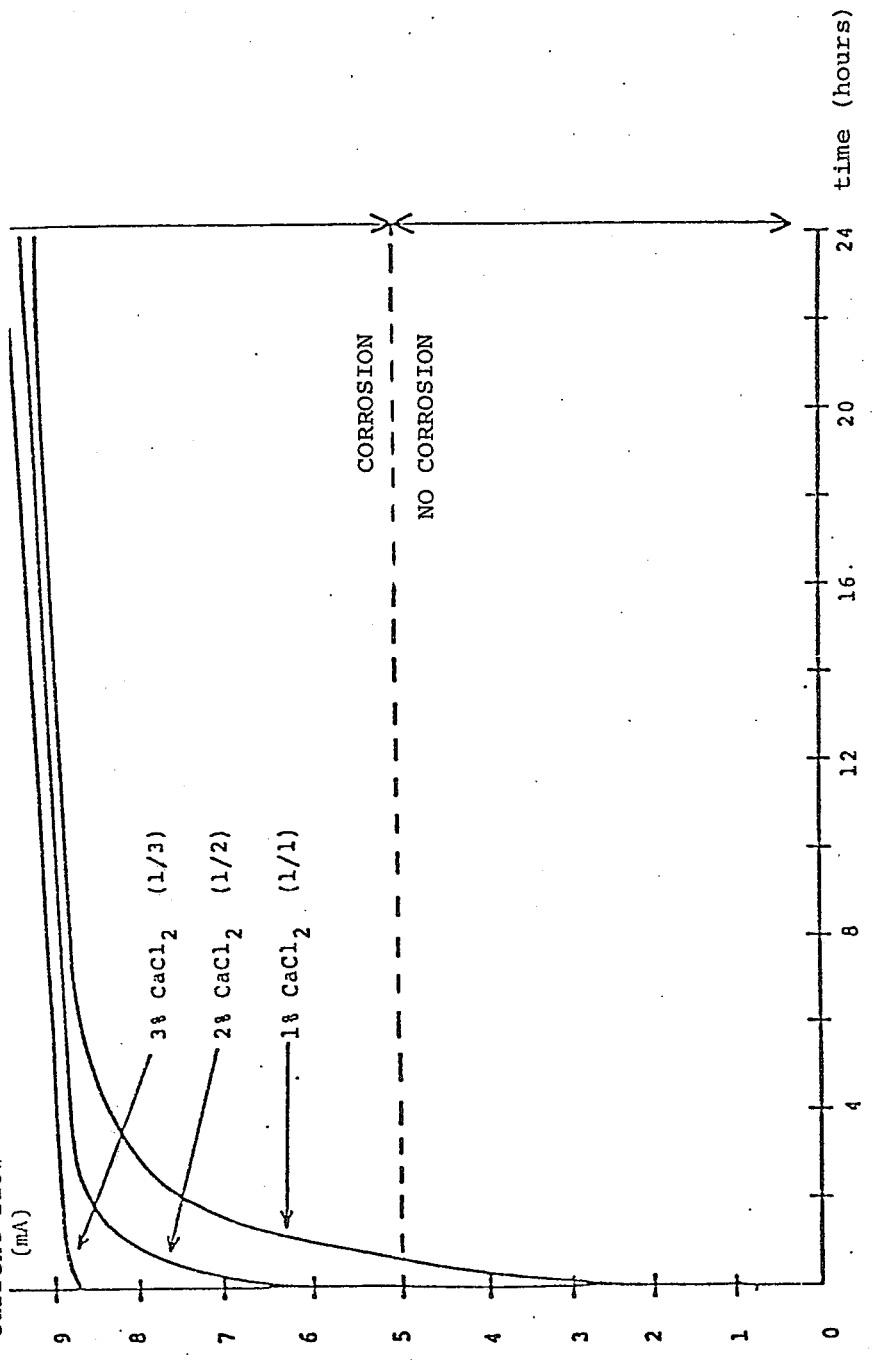

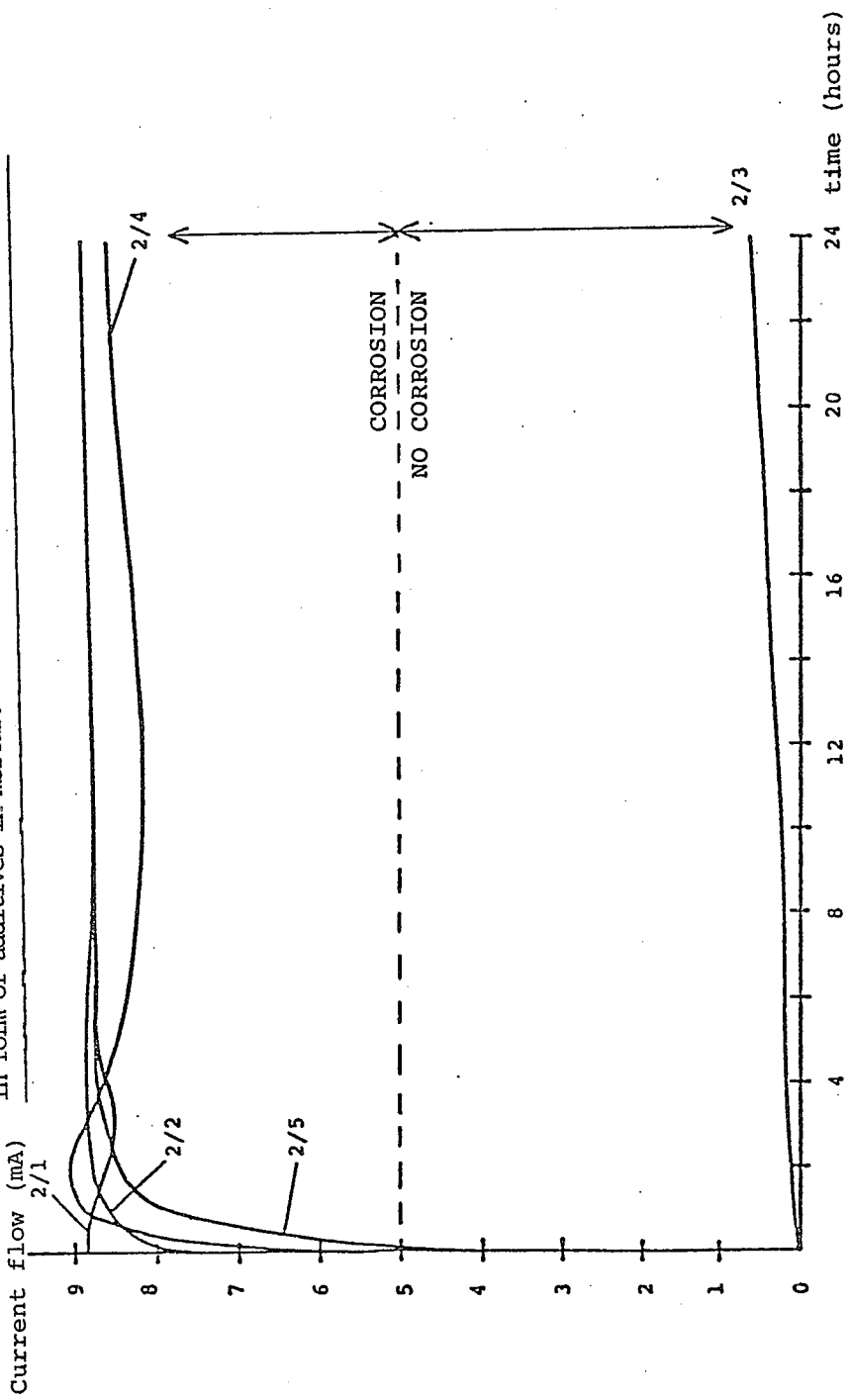

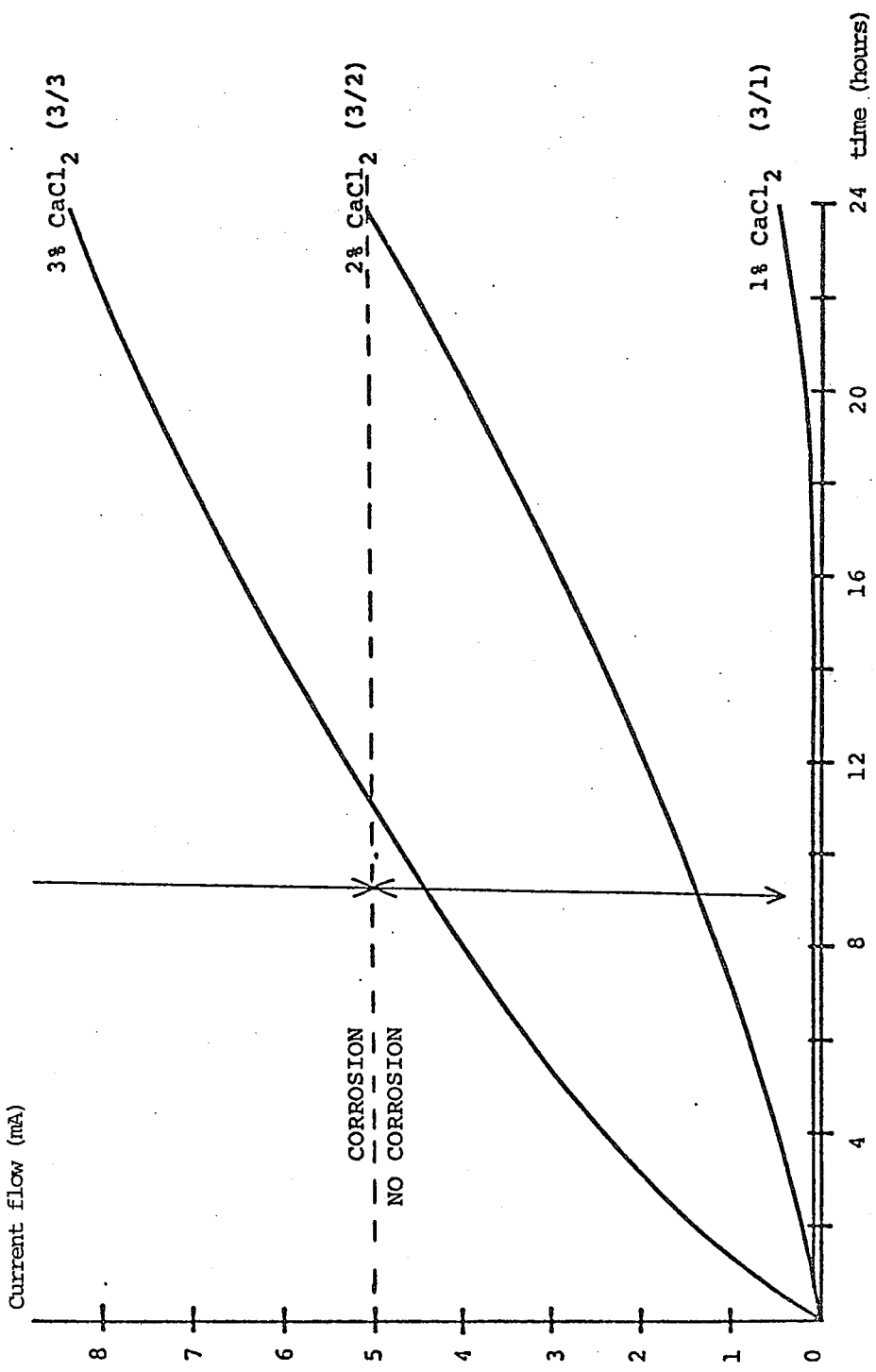
Figure 3: Potentio-static loading tests on mortar electrodes having various $CaCl_2$-dosages. Steel electrodes coated by a plastic material treated mortar.

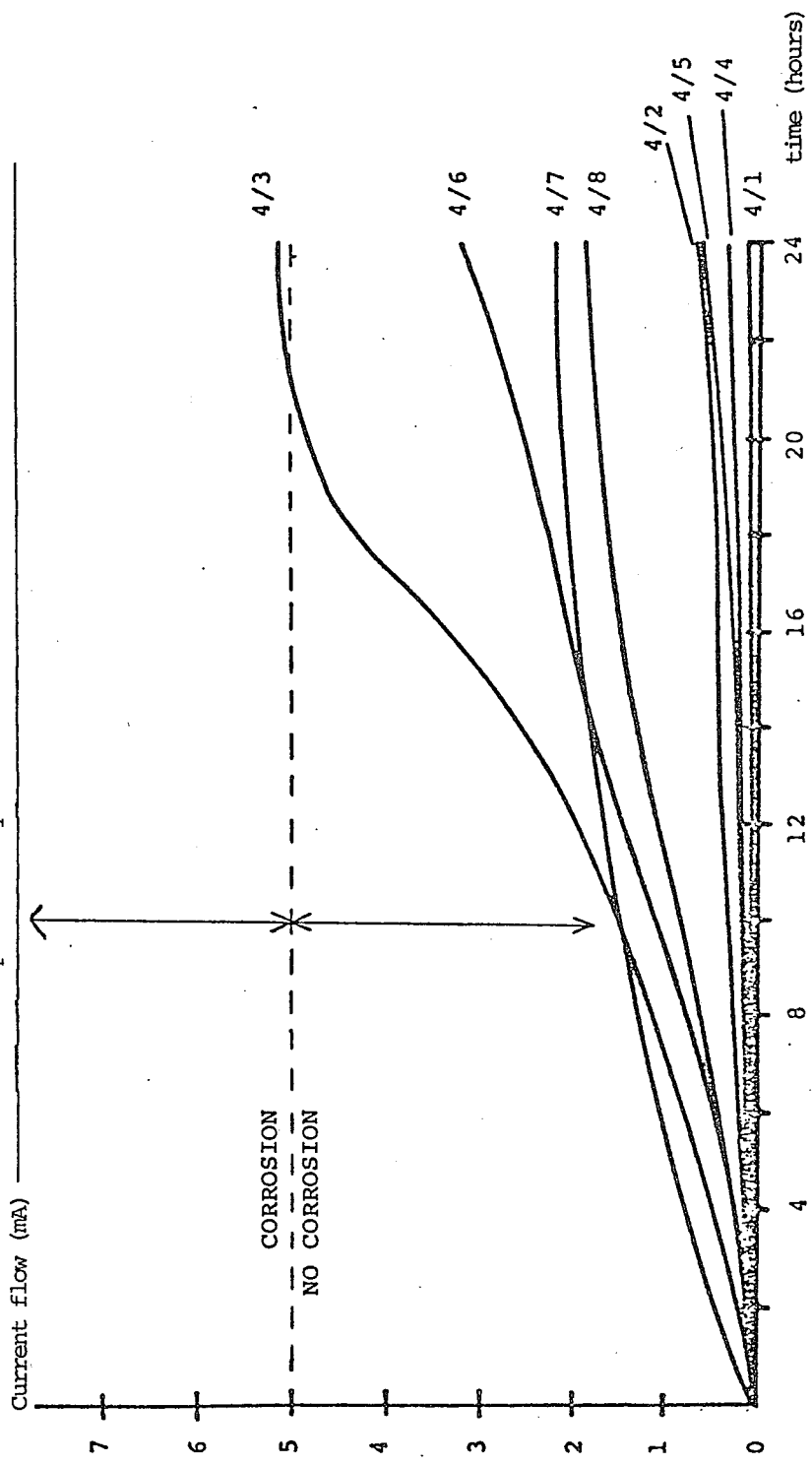

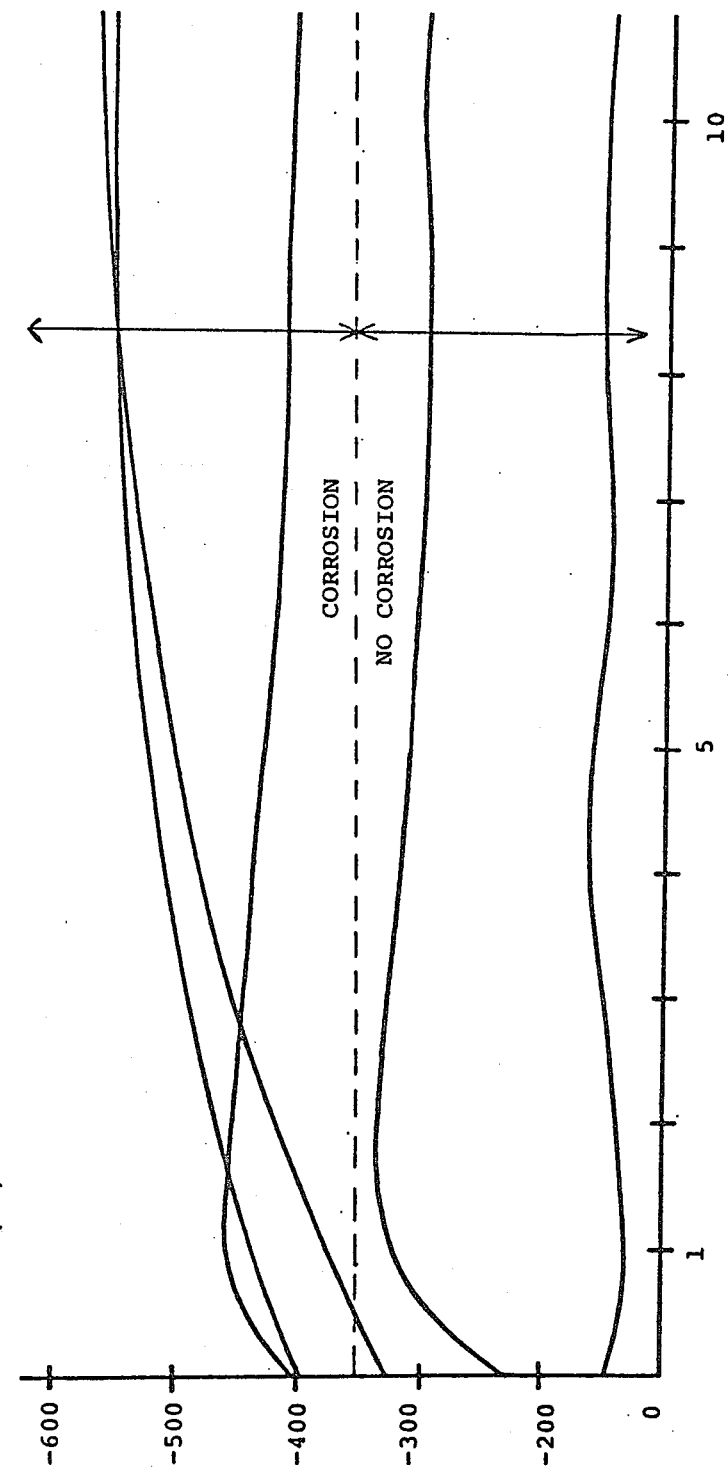
Figure 5: Measurements of potential on iron sheets in function of time in a chloride containing cement suspension

METHOD OF PROTECTING REINFORCING BARS, PRE-STRESSING CABLES AND SIMILAR ARTICLES INSIDE OF STRUCTURES

BACKGROUND OF THE INVENTION

1. Field of the Invention

The present invention relates to a method of protection against corrosion of reinforcing bars, prestressing cables and similar articles located within structures.

Structures which are fabricated from concrete, such as piers, harbor walls, offshore platforms, prestressed concrete located in salt water, concrete having additives or aggregates containing chloride ions, are subject to damage due to corrosion.

Corrosion of reinforcing bars may occur specifically in concrete structures which
  are located in salt water (ocean) (offshore structures)
  are manufactured with sand which contains salt,
  are manufactured with sand stemming from the ocean
  are located on beaches
  are treated with thawing salts
  are located in industrial areas (acid exhaust gases), or
  are manufactured with quick setting additives or antifreeze agents containing chloride ions.

Corrosion is an electrochemical process. The reaction products, rust and complex compounds with chloride, have a larger volume than the original starting materials. This leads to the formation of local cracks and spalling; therefore, additional salt can penetrate and thus the course of corrosion will accelerate.

Certain specific chemicals can prevent or delay such a process. These chemicals are added to the concrete in the form of an admixture during the production thereof and supposedly prolongs the durability of concrete structures. Such additives are marketed and sold already in the U.S.A. and in Japan. Generally, their main or sole content is calcium nitrite. Furthermore, a large number of patent specifications or published applications exist regarding this matter, such as the Canadian Pat. No. 802 281, U.S. Pat. No. 3,427,175, W. German Offenlegungsschift No. 3 005 896, Japanese Pat. Publication 33 940, U.S. Pat. No. 3,210,207, and U.S. Pat. No. 3,801,338. Due to their limited efficiency other inhibitors such as benzoates, chromates, phosphates, amines, etc. have hitherto not found a large technical application.

The drawback of the presently available corrosion inhibiting additives for concrete is that they are distributed throughout the concrete which leads to extremely high dosages of such additives. Due to their high toxicity, highly concentrated nitrite solutions or solid nitrite additives are not welcome at construction sites. It is a known fact that the effectiveness of such additives regarding the inhibition of corrosion is related to their dosage and simultaneously to the concentration of salt in the concrete structure. The case of the formation of large cracks due to an improper concreting a reinforcing bar which is located at such area will not be protected against corrosion in spite of the presence of corrosion inhibiting additive in the concrete because the salt at such an area may be present in a high concentration.

Due to its highly alkaline medium (pH > 12) concrete possesses corrosion protective features because reinforcing bars are passivated in this pH range. In case of a high addition of latent hydraulic materials the pH value may, however, decrease to a range which is no longer corrosion protective. However, concrete is seldom so dense that no chloride penetration occurs. Concrete may contain from the outset chlorides from additives, water or additive materials so that concrete may hardly protect iron against corrosion over an extended time span.

2. Description of the Prior Art

Presently, the following three methods are practically followed:

A coating of the reinforcing bars by synthetic resins, specifically epoxides, leads to a complete protection against corrosion in case that the coating is sufficiently thick and will not be damaged during the placing or mounting, respectively. The drawbacks are: high costs, no adhering of concrete to the protective layer, electrical insulation, and at damaged areas the generation of local cells which lead to a locally accelerated corrosion.

Galvanized usually zinc plated iron or steel bars are excellently protected against corrosion. It is, however, known that the zinc coating will be dissolved due to the alkalinity of the cement. Therefore, the protective effect is limited regarding durability.

A third known method is cathodic corrosion protection. It consists of applying a predetermined voltage which inhibits the corrosion of iron. The drawbacks of this method are, however, that at different areas voltages should be applied depending on the local concentration of salt and voltage drop within the concrete. Practically such a method is very difficult to be controlled in a reinforced concrete structure. An unsuitably applied cathodic protection against corrosion may lead to the loss of the adherence of the reinforcement to the concrete or even to an accelerated corrosion.

SUMMARY OF THE INVENTION

Hence, it is a general object of the invention to provide an improved method of preventing a contact between corrosion promoting substances and reinforcing bars.

A further object is to provide a protective material with excellent adhesive strengths to the reinforcing bars as well as to the concrete and therefore a load-carrying connection between the reinforcement and the concrete.

A further object is to provide a waterproof covering layer which inhibits the penetration of salt and reacts in an alkaline way in order to passivate iron, i.e. the the reinforcement.

Yet a further object is to incorporate additional corrosion inhibiting agents to the coating material to additionally improve the effect of protection against corrosion and to passivate local defects in the coating.

A further object is to provide a method of coating reinforcing bars or prestressing cables, and similar materials by an aqueous slurry of 10–99.99% of hydraulic binding agents or mixtures thereof with latent hydraulic additives, and 0.01–10% corrosion inhibiting agents.

The above objects are realized by the inventive mixture comprising cement, filling agents, polymers and e.g. nitrite, dicarboxylic acids and amines as corrosion inhibitors. The inventive mortar can be applied onto the reinforcing bars in the form of a one- or two-component product by standard methods such as brushing, rolling, spraying or dipping. The inventive material may also be used for injections into jacketing tubes in structures of prestressed concrete or in suspended structures. A further application is the repair of structures.

The invention will be better understood and objects other than those set forth above will become apparent considering the following detailed description. Examples of preferred embodiments are set forth below.

DETAILED DESCRIPTION OF THE INVENTION

The present invention provides a method of protecting reinforcing bars, pre-stressing cables and similar articles inside of structures against corrosion, comprising the coating or covering of the reinforcing bars or pre-stressing cables, or similar articles, by an aqueous suspension of 10-99.99% hydraulic binding agents or mixtures thereof with latent hydraulic additives and 0.01-10% corrosion inhibitors.

The hydraulic binding agent may be cement. The latent hydraulic additives are chosen from the group fly-ash, silica fume, slags, and others. Other materials may be added. For example, 89.99% polymers in a powdery, dissolved, dispersed or liquid state and/or up to about 89.99% fine aggregates can be added to said suspension.

The corrosion inhibitor consists of an alkali metal nitrite or an alkaline earth metal nitrite, preferably of sodium nitrite. The said corrosion inhibitor may also consist of a mixture of an alkali metal nitrite or alkaline earth metal nitrite and a dicarboxylic acid having 1-10 $CH_2$ groups, preferably adipic acid. The corrosion inhibitor may also consist of a mixture of an alkali metal nitrite or alkaline earth metal nitrite and one or more amines, preferably of the group triazole, cyclohexylamine or an aliphatic amine having 4-17 $CH_2$ groups. More specifically, a corrosion inhibitor of the present invention comprises the following composition:

10-100% of alkali metal nitrite or alkaline earth metal nitrite
0-90% of dicarboxylic acid
0-90% of amine.

The polymers noted above are preferably acrylates, styrene-copolymers or amino-s-triazine resins. Furthermore, the aforementioned corrosion protection suspensions can be combined with known cement additives such as plasticizers, accelerators, retarders or expansion aids.

BRIEF DESCRIPTION OF THE DRAWINGS

FIG. 1 shows the results of potentiostatic polarization tests on non-protected mortar electrodes having various $CaCl_2$ dosages (tests 1/1 to 1/3).

FIG. 2 shows the results of potentiostatic polarization tests on mortar electrodes having various $CaCl_2$ dosages using steel electrodes having commercially available corrosion inhibiting agents in form of additives in mortar (tests 2/1 to 2/5).

FIG. 3 shows the results of potentiostatic polarization tests on mortar electrodes having various $CaCl_2$ dosages using steel electrodes coated with a polymer modified mortar (tests 3/1 to 3/3).

FIG. 4 shows the results of potentiostatic tests on mortar electrodes having various $CaCl_2$ dosages using steel electrodes protected by the method of the present invention (tests 4/1 to 4/8).

FIG. 5 shows measurements of potential on iron sheets against time in a chloride containing cement suspension (tests 5/1 to 5/5).

FIGS. 1-4 are referred to in Example 1 and FIG. 5 is referred to in Example 5.

EXAMPLE NO. 1

In order to test the effectiveness of the added corrosion inhibitors potentiostatic polarization tests were carried out on mortar electrodes.

The mortar electrodes which consist of mortar prisms (dimensions of prism 4×4×16 cm) with a centrally inserted steel electrode (length 10.5 cm; diameter 0.7 cm) are manufactured as follows:

Mortar prisms:
Portland cement, W/Z=0.5; aggregates 0-6 mm;
additives 1, 2, 3% $CaCl_2$; corrosion inhibiting agent (the dosage of all admixtures is defined from the weight of the cement)

Coating of steel electrodes:
polymer modified cementitious mortar; components A:B=1:4

Component A: 27.5% aqueous, anionic dispersion of an acrylic acid ester-copolymerisate.

Component B: 38% high quality Portland cement, 62% fine aggregates and processing aids; corrosion inhibitor (The dosage is defined from the weight of component B).

The steel electrodes are degreased with an organic solvent and polished bright by an abrasive paper immediately before they were used.

The measurements can be applied for the purpose of comparison to evaluate the inventive procedure against the usual corrosion protection systems which contain corrosion inhibitors in the entire concrete mixture. The potentiostatic measurements were carried out by means of the well-known three-electrode pattern (mortar electrode, platinum-plated auxiliary electrode, reference electrode (SCE) in a 5% NaCl solution. The polarization test lasted 24 hours, whereby the voltage applied was held constant at −200 mV (SCE) and the resultant current flow was measured.

The tests which were carried out are listed in tabulation 1 and the test results are graphically shown in FIGS. 1 to 4.

After termination of the potentiostatic polarization test the steel electrodes which were mounted in the mortar prisms were freed and checked with regard to damage due to corrosion. It was ascertained that no optically visible damage due to corrosion was present on the steel electrodes, of which the current flow during the polarization test did not exceed 5 mA.

TABULATION 1

Summary of corrosion tests for the potentiostatis polarization test
(Test results see FIGS. 1-4)

| Test No. | Dosage of salt in mortar | Coating of steel | Inhibitor | Condition of steel electrode after test |
|---|---|---|---|---|
| 1/1 | 1% $CaCl_2$ | — | — | K, I |
| 1/2 | 2% $CaCl_2$ | — | — | K |
| 1/3 | 3% $CaCl_2$ | — | — | K |
| 2/1 | 3% $CaCl_2$ | — | 1% Rusnein* | K |
| 2/2 | 3% $CaCl_2$ | — | 3% Rusnein | K |
| 2/3 | 1% $CaCl_2$ | — | 6% Rusnein | I |
| 2/4 | 2% $CaCl_2$ | — | 6% Rusnein | K |
| 2/5 | 3% $CaCl_2$ | — | 6% Rusnein | K |
| 3/1 | 1% $CaCl_2$ | Polymer modified cement mortar** | — | I |
| 3/2 | 2% $CaCl_2$ | | — | I |
| 3/3 | 3% $CaCl_2$ | | — | K |

TABULATION 1-continued

Summary of corrosion tests for the potentiostatis polarization test
(Test results see FIGS. 1–4)

| Test No. | Dosage of salt in mortar | Coating of steel | Inhibitor | Condition of steel electrode after test |
|---|---|---|---|---|
| 4/1 | 1% CaCl$_2$ | Polymer modified modified cement mortar and corrosion inhibitors in accordance with the invention*** | 3% Na—nitrite | I |
| 4/2 | 2% CaCl$_2$ | | 3% Na—nitrite | I |
| 4/3 | 3% CaCl$_2$ | | 3% Na—nitrite | I |
| 4/4 | 1% CaCl$_2$ | | 0.5% Na—nitrite 0.5% Adipic acid | I |
| 4/5 | 2% CaCl$_2$ | | 0.5% Na—nitrite 0.5% Adipic acid | I |
| 4/6 | 3% CaCl$_2$ | polymer modified cement mortar and corrosion inhibitors in accordance with the invention*** | 0.5% Na—nitrite 0.5% Adipic acid | I |
| 4/7 | 3% CaCl$_2$ | | 2% Dicyclohexylammoniumnitrite | I |
| 4/8 | 3% CaCl$_2$ | | 2% Dicyclohexylammoniumnitrite 1% Adipic acid | I |

*Commercially available corrosion inhibitor of the Onoda Cement Co. (Japan).
**Coating with polymer modified mortars is known in the prior art.
***Corrosion protection in accordance with the invention.
K = Distinct traces of corrosion visible on the steel electrode; some mortar prisms show cracks.
I = No corrosion products visible.

EXAMPLE NO. 2

Measurements of the potential were carried out on bare and on coated iron sheets (100×55×0.1 mm) which were submerged in a suspension of cement having a constant chloride content (2% NaCl relative to the cement) during a period of 13 days (Reference electrode: Standard calomel electrode (SCE)).

The test results shall prove that also unprotected, bare metal areas can be passivated electrically by the agency of the inventive polymer modified mortar which comprises a corrosion inhibitor if no chloride ions are present. To this end iron sheets are coated by a socalled label (20×24 mm) which is removed after completion of the coating.

The composition of the coating cement is the same as described in Example 1.

This procedure allows the simulation of faulty areas. The tests which were carried out are listed in Tabulation 2, and the measured potentials of the individual tests are graphically shown in FIG. 5 in function of time.

The evaluation of the results proceeded in accordance with the following empirical criteria:

It has become obvious that for the largest part of the tests the corrosion limit can be set at −350 mV vs SCE. This leads to the conclusion that in accordance with the described method it was possible to observe corrosion products in case of the potential of the iron sheets tested being below −350 mV vs SCE.

TABULATION 2

Summary of the corrosion tests which were carried out (measurements of potential)

| Test No. | Coating | Inhibitor | Condition of sheet after 12 days |
|---|---|---|---|
| 5/1 | — | — | K |
| 5/2 | Epoxy coating with bare unprotected faulty areas | — | K |
| 5/3 | Polymer modified cement mortar | — | K |
| 5/4 | Inventive polymer modified cement mortar having bare unprotected faulty areas | 3% NaNO$_2$ | I |
| 5/5 | Inventive polymer modified cement mortar without "faulty areas" | 3% NaNO$_2$ | I |

K = Distinctly visible corrosion (pitting, localized corrosion) on iron sheet.
I = No corrosion visible.

While there are shown and described present preferred embodiments of the invention, it is to be distinctly understood that the invention is not limited thereto, but may be otherwise variously embodied and practiced within the scope of the following claims.

What is claimed is:

1. A method of protecting reinforcing bars, prestressing cables and similar articles inside of structures against corrosion, comprising the coating or covering of the reinforcing bars or prestressing cables, or similar, by an aqueous suspension of 10–99.99% hydraulic binding agents or mixtures thereof with latent hydraulic additives and 0.01–10% corrosion inhibitors.

2. The method of claim 1, wherein said hydraulic binding agent comprises cement.

3. The method of claim 1, wherein said latent hydraulic additives are chosen from the group fly-ash, silica fume and slags.

4. The method of claim 1, wherein up to about 89.99% polymers in a powdery, dissolved, dispersed or liquid state and/or up to about 89.99% fine aggregates are added to said suspension.

5. The method of claim 1, wherein said corrosion inhibitor consists of an alkalimetal nitrite or alkaline earth metal nitrite.

6. The method of claim 1, wherein said corrosion inhibitor consists of a mixture of alkalimetal nitrite or alkaline earth metal nitrite and a dicarboxylic acid having 1–10 CH$_2$ groups.

7. The method of claim 1, wherein said corrosion inhibitor consists of a mixture of an alkali metal nitrite or alkaline earth metal nitrite and at least one amine.

8. The method of claim 1, wherein said corrosion inhibitor comprises the following composition:
   10–100% of alkali metal nitrite or alkaline earch metal nitrite
   0–90% of Dicarboxylic acid
   0–90% of amine.

9. The method of claim 4, wherein said polymers are acrylates, styrene-copolymers or amino-s-triazine resins.

10. The method of claim 1, wherein said corrosion protection suspensions are combined with known cement additives selected from plasticizers, accelerators, retarders or expansion aids.

11. The method of claim 5, wherein the corrosion inhibitor is sodium nitrite.

12. The method of claim 6, wherein the dicarboxylic acid is adipic acid.

13. The method of claim 7, wherein the amine is selected from the group consisting of triazole, cyclohexylamine and an aliphatic amine having 4 to 17 CH$_2$ groups.

* * * * *